(12) United States Patent
Major et al.

(10) Patent No.: US 8,951,010 B2
(45) Date of Patent: Feb. 10, 2015

(54) INNER DIAMETER SHROUD ASSEMBLY FOR VARIABLE INLET GUIDE VANE STRUCTURE IN A GAS TURBINE ENGINE

(75) Inventors: Daniel W. Major, Middletown, CT (US); John C. Ditomasso, Glastonbury, CT (US); Nathan F. Champion, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 37 days.

(21) Appl. No.: 13/531,679

(22) Filed: Jun. 25, 2012

(65) Prior Publication Data

US 2012/0257963 A1  Oct. 11, 2012

Related U.S. Application Data

(63) Continuation of application No. 12/478,955, filed on Jun. 5, 2009, now Pat. No. 8,328,512.

(51) Int. Cl.
*F04D 29/54* (2006.01)
*F01D 17/16* (2006.01)
*F01D 25/24* (2006.01)

(52) U.S. Cl.
CPC ............ *F01D 17/162* (2013.01); *F01D 25/246* (2013.01); *F05C 2203/00* (2013.01); *Y02T 50/672* (2013.01); *F05D 2240/12* (2013.01); *F05D 2260/30* (2013.01); *F05D 2260/74* (2013.01); *F05D 2300/603* (2013.01)
USPC .................... 415/209.4; 415/210.1

(58) Field of Classification Search
USPC ............ 415/200, 209.2, 209.3, 209.4, 210.1, 415/214.1; 411/353
See application file for complete search history.

(56) References Cited

U.S. PATENT DOCUMENTS

| | | | |
|---|---|---|---|
| 2,671,634 A * | 3/1954 | Morley | 415/160 |
| 3,727,660 A | 4/1973 | Burge | |
| 3,824,034 A | 7/1974 | Leicht | |
| 4,053,256 A | 10/1977 | Hertel | |
| 4,245,954 A | 1/1981 | Glenn | |
| 4,566,851 A | 1/1986 | Comeau et al. | |
| 4,643,636 A * | 2/1987 | Libertini et al. | 415/138 |
| 4,792,277 A | 12/1988 | Dittberner, Jr. et al. | |
| 4,904,156 A | 2/1990 | Touze | |
| 5,190,439 A | 3/1993 | Das | |

(Continued)

FOREIGN PATENT DOCUMENTS

| | | |
|---|---|---|
| EP | 1319844 | 6/2003 |
| EP | 1531234 | 5/2005 |

(Continued)

OTHER PUBLICATIONS

European Search Report for European Patent Application No. 10251046.8 completed on Jun. 26, 2013.

*Primary Examiner* — Edward Look
*Assistant Examiner* — Jason Davis
(74) *Attorney, Agent, or Firm* — Carlson, Gaskey & Olds P.C.

(57) ABSTRACT

An inner shroud assembly includes an aft core segment mountable to a forward core segment to support a multiple of vanes for rotational movement relative thereto. A shroud backing plate segment engageable with the aft core segment and at least one fastener which passes through the shroud backing plate, the aft core segment and the forward core segment.

15 Claims, 16 Drawing Sheets

(56) References Cited

U.S. PATENT DOCUMENTS

| | | | |
|---|---|---|---|
| 5,308,226 A | 5/1994 | Venkatasubbu et al. | |
| 5,421,703 A * | 6/1995 | Payling | 415/209.4 |
| 5,609,466 A | 3/1997 | North et al. | |
| 5,622,473 A | 4/1997 | Payling | |
| 6,129,512 A | 10/2000 | Agram et al. | |
| 6,413,043 B1 | 7/2002 | Bouyer | |
| 6,457,925 B1 * | 10/2002 | Genick, II | 411/353 |
| 6,474,941 B2 | 11/2002 | Dingwell et al. | |
| 6,682,299 B2 | 1/2004 | Bowen et al. | |
| 6,790,000 B2 | 9/2004 | Wolf | |
| 6,843,638 B2 | 1/2005 | Hidalgo et al. | |
| 6,887,035 B2 | 5/2005 | Bruce | |
| 7,125,222 B2 | 10/2006 | Courmier et al. | |
| 7,163,369 B2 | 1/2007 | Bruce | |
| 7,198,465 B1 * | 4/2007 | Ichiryu | 415/214.1 |
| 7,207,770 B2 | 4/2007 | Bruce | |
| 2007/0020093 A1 * | 1/2007 | Giaimo et al. | 415/160 |
| 2008/0219832 A1 | 9/2008 | Major et al. | |
| 2009/0016886 A1 | 1/2009 | Pichel | |
| 2010/0104433 A1 | 4/2010 | Shi et al. | |

FOREIGN PATENT DOCUMENTS

| | | |
|---|---|---|
| EP | 1998006 | 3/2008 |
| EP | 2011965 | 1/2009 |

* cited by examiner

INNER DIAMETER SHROUD ASSEMBLY FOR VARIABLE INLET GUIDE VANE STRUCTURE IN A GAS TURBINE ENGINE

RELATED APPLICATION

This application is a continuation of U.S. Ser. No. 12/478,955, which was filed on Jun. 5, 2009 now U.S. Pat. No. 8,328,512.

BACKGROUND

The present disclosure relates to a gas turbine engine and more particularly to an inner diameter shroud assembly for a variable inlet guide vane structure.

Gas turbine engines generally include a high pressure compressor, a combustor, and a high pressure turbine. The high pressure compressor, combustor, and high pressure turbine may be collectively referred to as the core of an engine. Such gas turbine engines also may include a low pressure compressor for supplying compressed air, for further compression, to the high pressure compressor.

The low pressure compressor typically includes a rotor surrounded by a casing. The casing is typically fabricated to be removable, such as by forming the casing into portions that are removably joined together. The low pressure compressor includes a plurality of stages and each stage includes a row of rotor blades and a row of stator vanes. The casing supports the stator vanes, and the rotor supports the rotor blades. The stator vane rows typically direct air flow toward a downstream rotor blade row.

Several compressor stator vanes may be rotatively mounted to allow each vane to rotate around a longitudinal axis which extends in a radial direction from the centerline of the engine to adjust the angular orientation of the vane relative to the airflow. These variable stator vane assemblies facilitate control of air flow through the compressor to enhance performance of the compressor.

Integration of the variable stator vane assemblies into the casing may be relatively complicated. Furthermore, assembly modularity of various case design philosophies such as ring-case and split-case arrangements may need to be accommodated.

SUMMARY

An inner shroud assembly according to an exemplary aspect of the present disclosure includes an aft core segment mountable to a forward core segment to support a multiple of vanes for rotational movement. A shroud backing plate segment engageable with the aft core segment and at least one fastener which passes through the shroud backing plate to retain the aft core segment to the forward core segment.

An inner shroud assembly according to an exemplary aspect of the present disclosure includes an aft core segment mountable to a forward core segment to support a multiple of vanes for rotational movement. A shroud backing plate segment engageable with the aft core segment. A fastener retainer mountable to the shroud backing plate segment. At least one fastener receipt member mountable within the aft core segment and the forward core segment, the at least one fastener receipt member spans the aft core segment and the forward core segment. A fastener which passes through the fastener retainer and the shroud backing plate to retain the aft core segment to the forward core segment.

An inner shroud assembly according to an exemplary aspect of the present disclosure includes an aft core segment mountable to a forward core segment to support a multiple of vanes for rotational movement. A shroud backing plate segment engageable with the aft core segment, the shroud backing plate defines an aft segment perpendicular to a base segment, the base segment at least partially spans the aft core segment and the forward core segment. At least one alignment member mountable within the aft core segment and the forward core segment. At least one fastener receipt member mountable within the shroud backing plate and a fastener which passes through said fastener receipt member to retain the aft core segment to the forward core segment.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
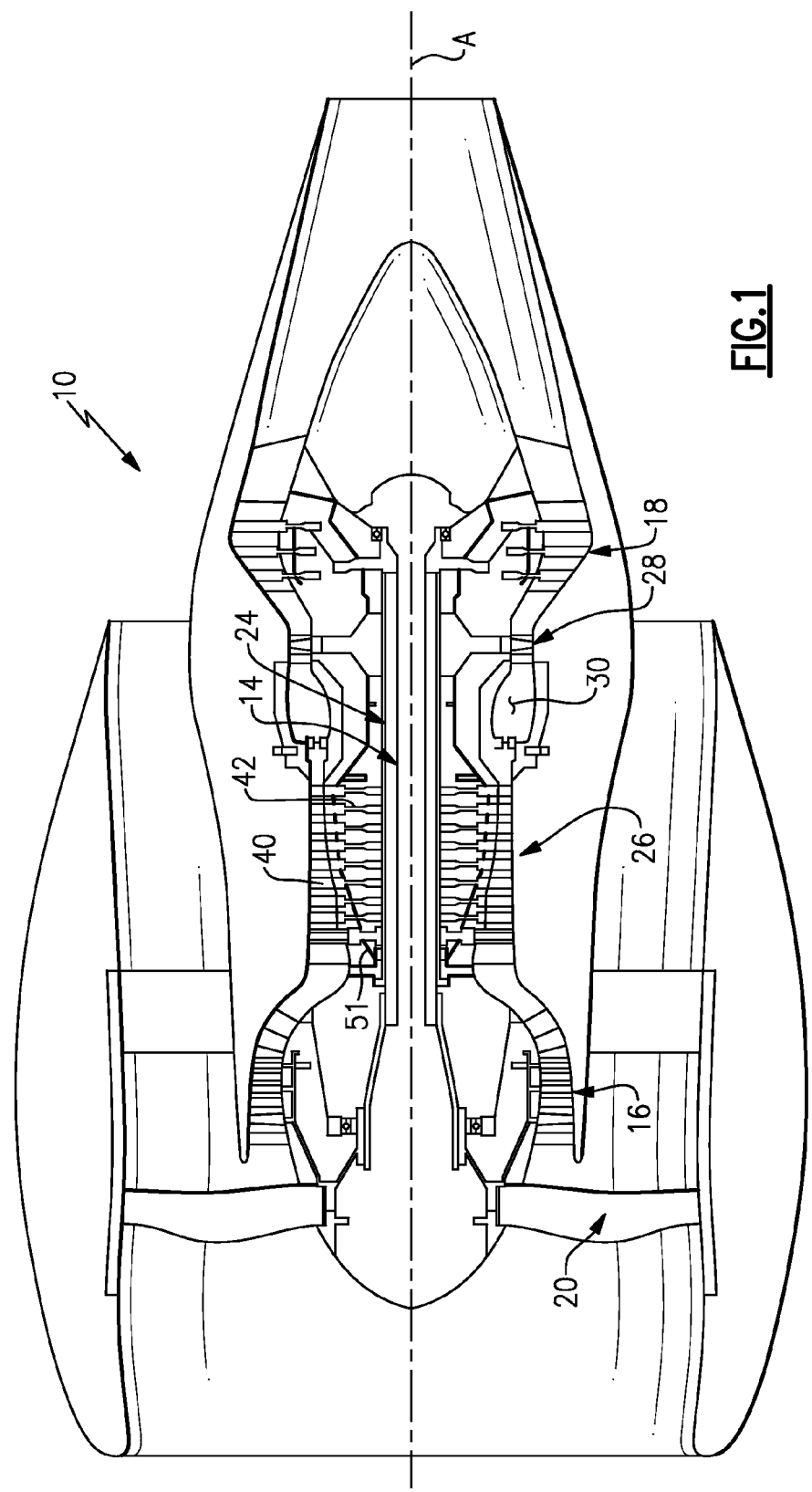
FIG. 1 is a general schematic sectional view through a gas turbine engine along the engine longitudinal axis.

FIG. 1 illustrates a general schematic view of a gas turbine engine 10 such as a gas turbine engine for propulsion. While a two spool high bypass turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Air compressed in the compressor 16, 26 is mixed with fuel, burned in the combustor 30, and expanded in turbines 18, 28. The air compressed in the compressors 16, 26 and the fuel mixture expanded in the turbines 18, 28 may be referred to as a hot gas stream along a core gas path. The turbines 18, 28, in response to the expansion, drive the compressors 16, 26 and fan section 20.

Figure 2:
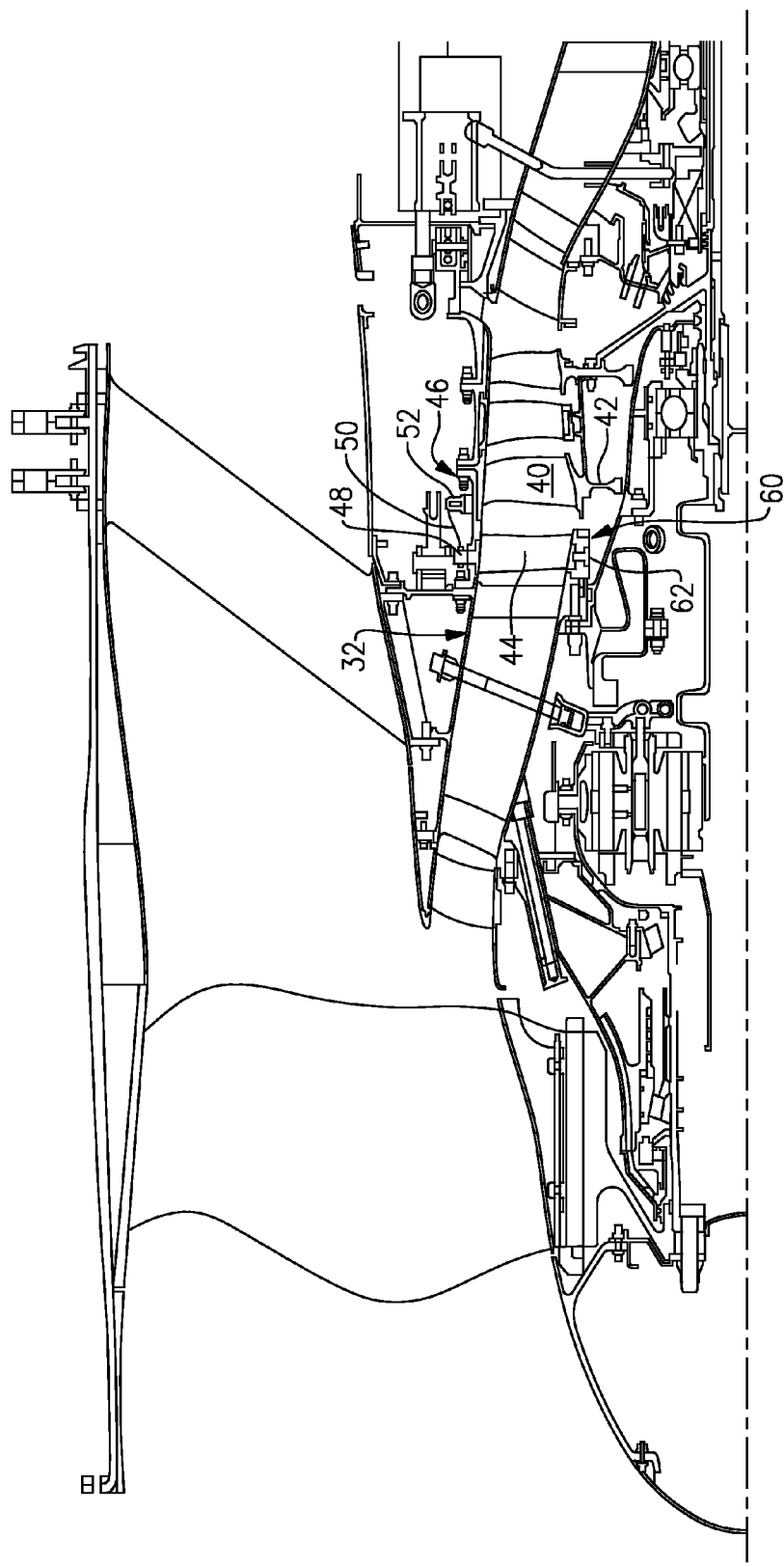
FIG. 2 is a expanded schematic sectional view through a low pressure compressor section of the gas turbine engine illustrating one embodiment of an inner shroud assembly.

Referring to FIG. 2, the low pressure compressor 16 includes alternate rows of low pressure compressor rotor blades 40 mountable to disks 42 which at least partially define a rotor stage. A multiple of variable inlet guide vanes 44 facilitate direction of the airflow from a front center body 32 into the low pressure compressor rotor blades 40.

An outer shroud 46, which may also be referred to as a ring case, secures an outer trunion 48 of each variable vane 44. The outer trunion 48 is driven to pivot by a linkage 50 connected to an actuator 52.

An inner shroud assembly 60 secures an inner trunion 62 of each variable vane 44 for pivotal movement. It should be understood that although the front center body 32 is disclosed as the static structure to which the inner shroud assembly 60 is attached in the disclosed, non-limiting embodiment, the inner shroud assembly 60 may be mounted to other static structures.

The variable vane 44 can be caused to pivot through operation of the actuator 52 and linkage 50 in response to operational conditions to control the direction of air delivered from one compressor stage to the downstream compressor stage. The times when such pivotal movement is desirable are within the level or ordinary skill in the art. This disclosure relates to an inner shroud assembly 60, and not the movement of the vane 44 itself. Although a particular variable inlet guide vane 44 stage is illustrated in the disclosed non-limiting embodiment, it should be understood that any variable vane structure may benefit herefrom.

Figure 3:
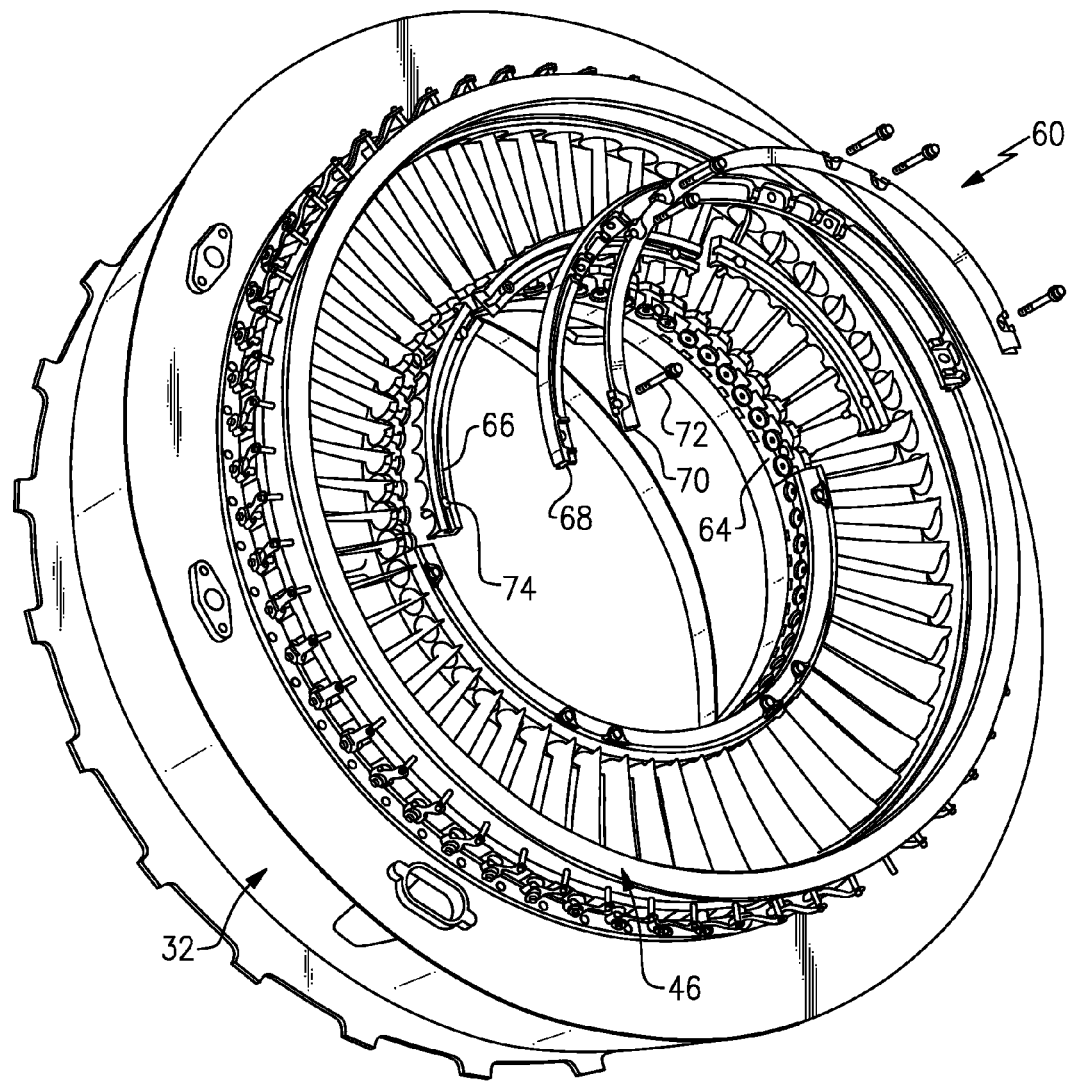
FIG. 3 is an exploded view of the inner shroud assembly viewed from an aft perspective thereof.

Referring to FIG. 3, the inner shroud assembly 60 generally includes a multiple of forward core segments 64, a multiple of aft core segments 66, a multiple of shroud backing plate segments 68, a multiple of fastener retainers 70, a multiple of fasteners 72 and a multiple of fastener receipt members 74.

Figure 4:
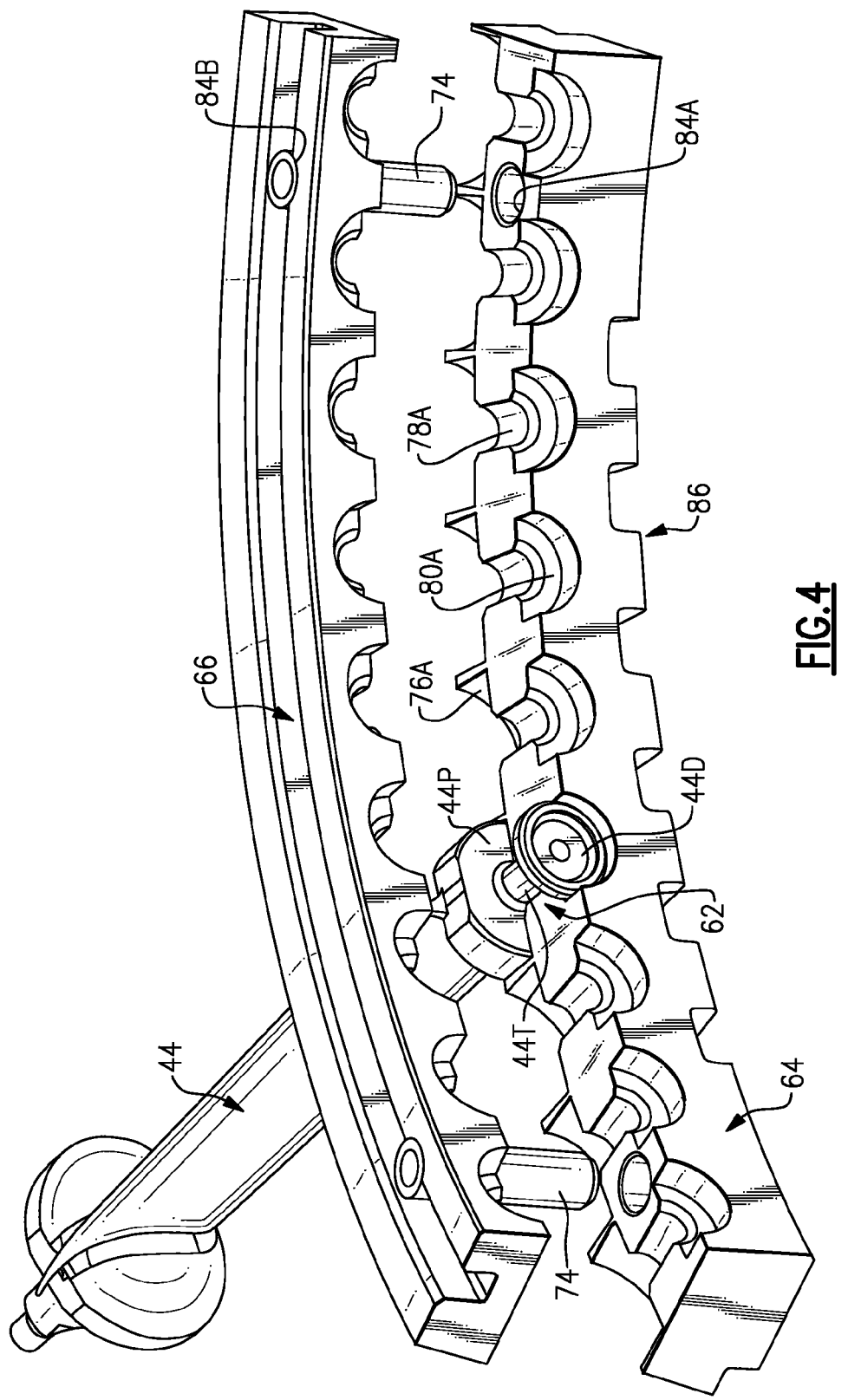
FIG. 4 is an exploded view of a forward core segment and an aft core segment from an aft perspective thereof.
Figure 5:
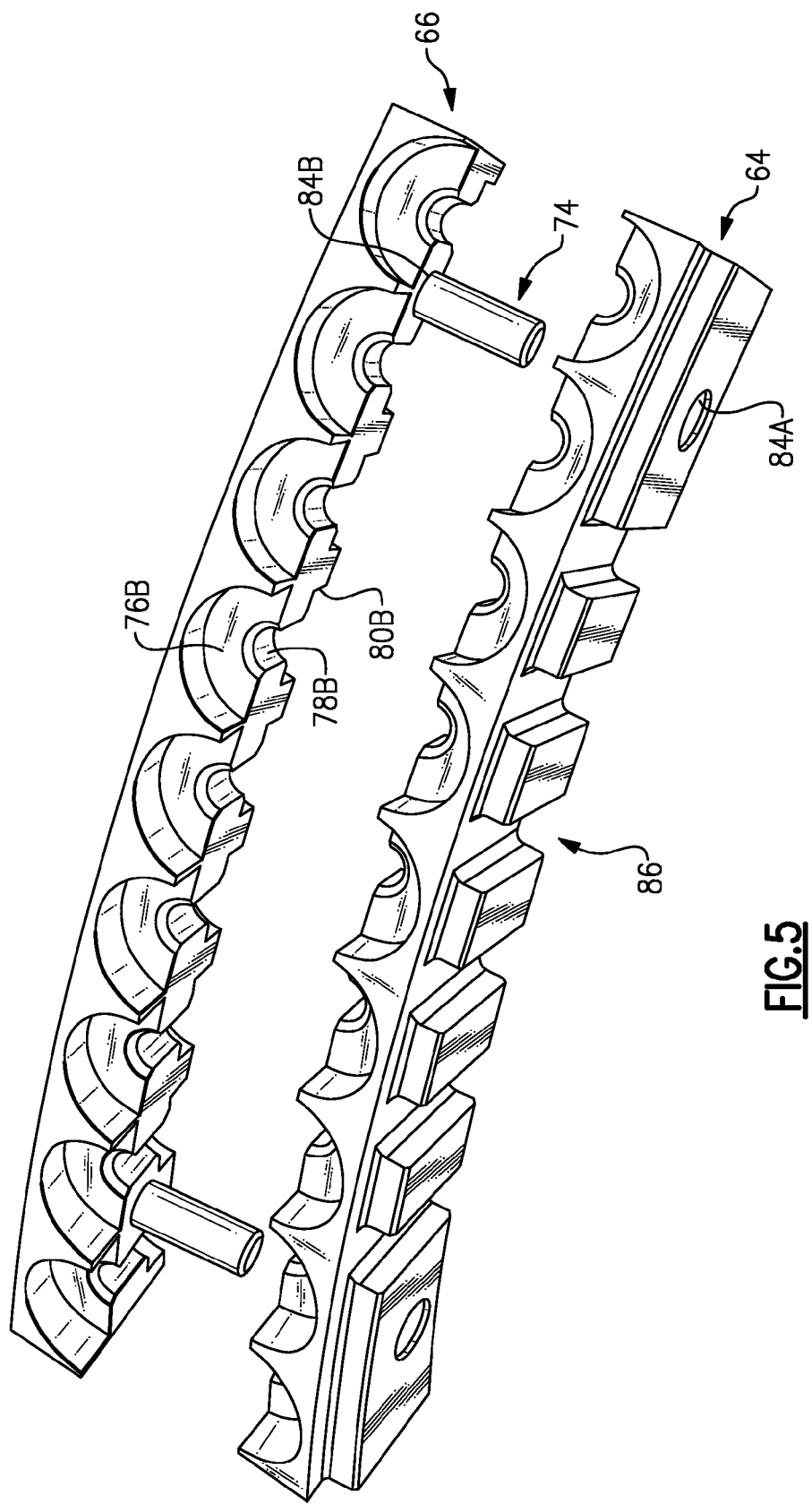
FIG. 5 is an exploded view of the forward core segment and the aft core segment from a top perspective thereof.

The forward core segments 64 and the aft core segments 66 in the disclosed, non-limiting embodiment are manufactured of a composite material and define an arcuate segment of approximately sixty degrees. Each of the forward core segments 64 and the aft core segments 66 have corresponding outer support surfaces 76A, 76B which are part-cylindrical to receive a platform 44P of the vane 44 (FIGS. 4 and 5). Respective corresponding part-cylindrical inner support surfaces 80A, 80B support an extended diameter portion 44D of the inner trunion 62 with a reduced diameter part-cylindrical center portion 78A, 78B located between the outer support surfaces 76A, 76B and the inner support surfaces 80A, 80B to capture an intermediate portion 44T of the inner trunion 62. It should be understood that the forward core segments 64 and the aft core segments 66 may define alternative support structures to support an inner trunion of other configurations and designs.

Figure 6:
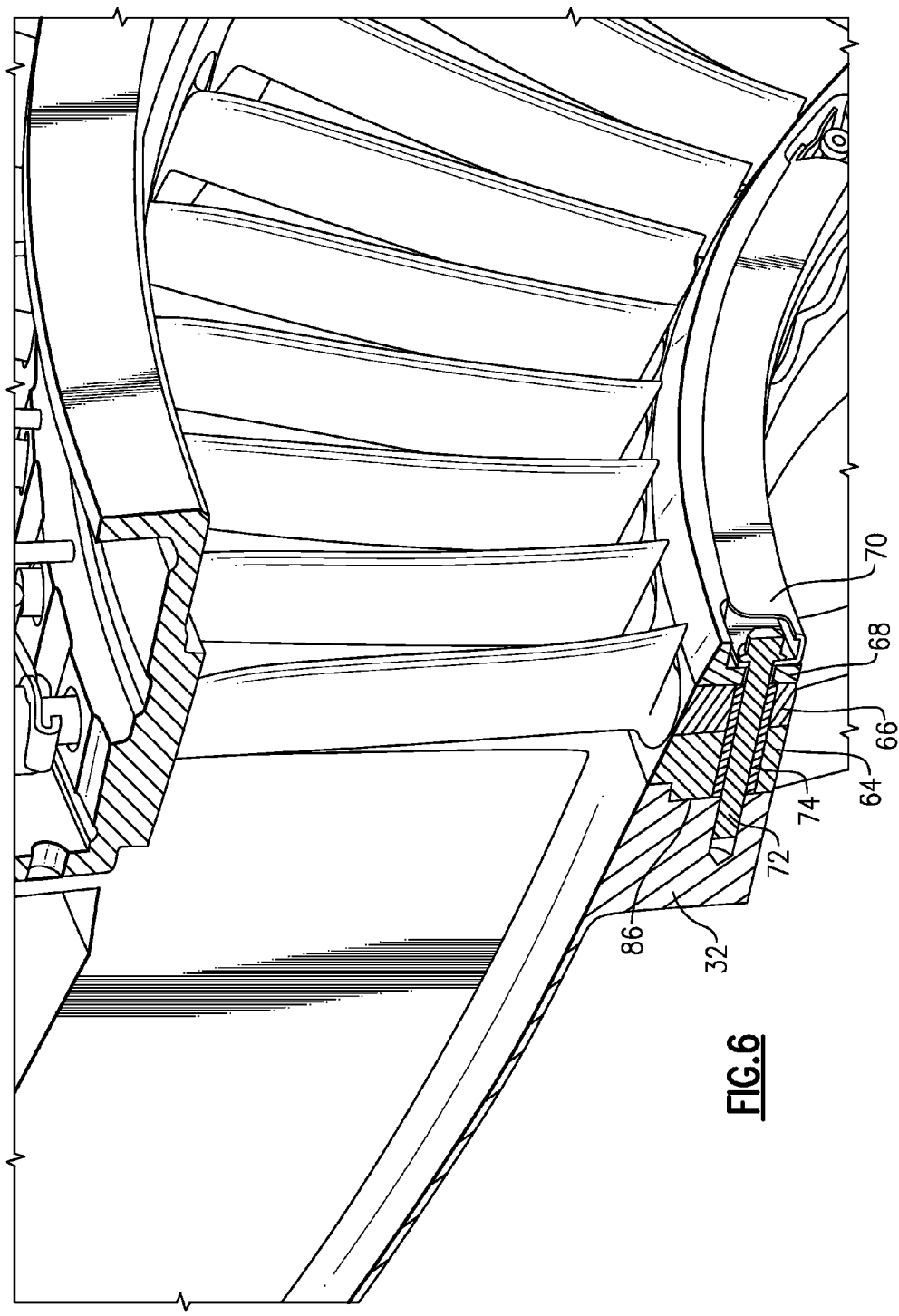
FIG. 6 is a perspective sectional view of the inner shroud assembly viewed from an aft perspective thereof attached to a forward center body engine casing.

The forward core segments 64 and the aft core segments 66 include alignment apertures 84A (FIG. 4 from 84B to 84A), 84B each of which receive a fastener receipt member 74 therein. As the forward core segments 64 and the aft core segments 66 may be manufactured of a composite material, the fastener receipt members 74 may be manufactured of a metallic material to protect the forward core segments 64 and the aft core segments 66 from the fasteners 72 which pass therethrough to engage the front center body 32 (FIG. 6). The fastener receipt members 74 facilitate alignment and prevent relative rotation between the forward core segments 64 and the aft core segments 66. The fastener receipt members 74 also operate as standoffs to prevent compression of the forward core segments 64 and the aft core segments 66 when the fasteners 72 are tightened into the front center body 32.

Figure 7:
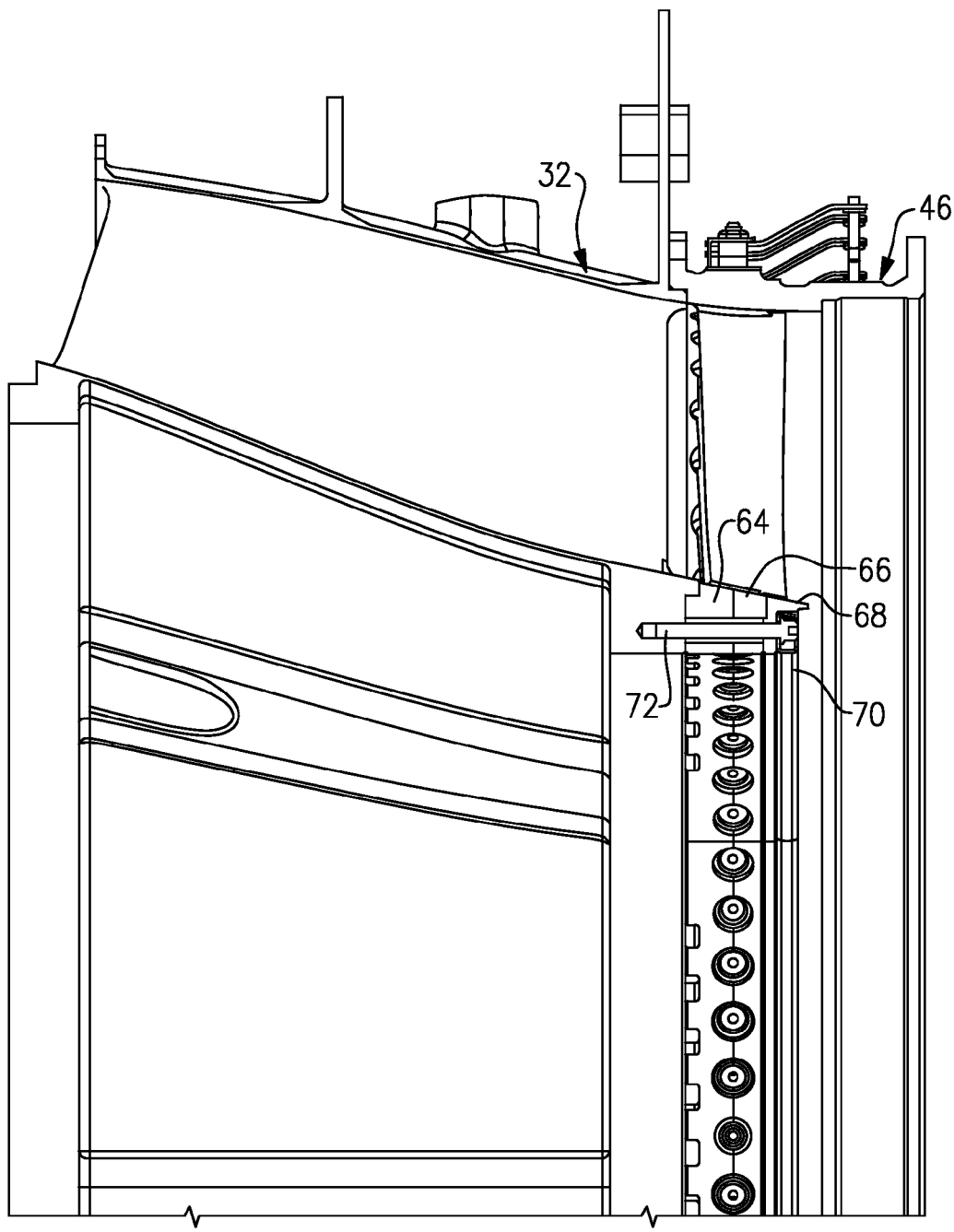
FIG. 7 is a longitudinal sectional view of the inner shroud assembly attached to the forward center body engine casing.

The forward core segments 64 also define a circumferentially intermittent interface surface 86 (FIG. 5) which locks the forward core segments 64 into the front center body 32 which includes a corresponding intermittent interface surface (FIG. 7).

Figure 8:
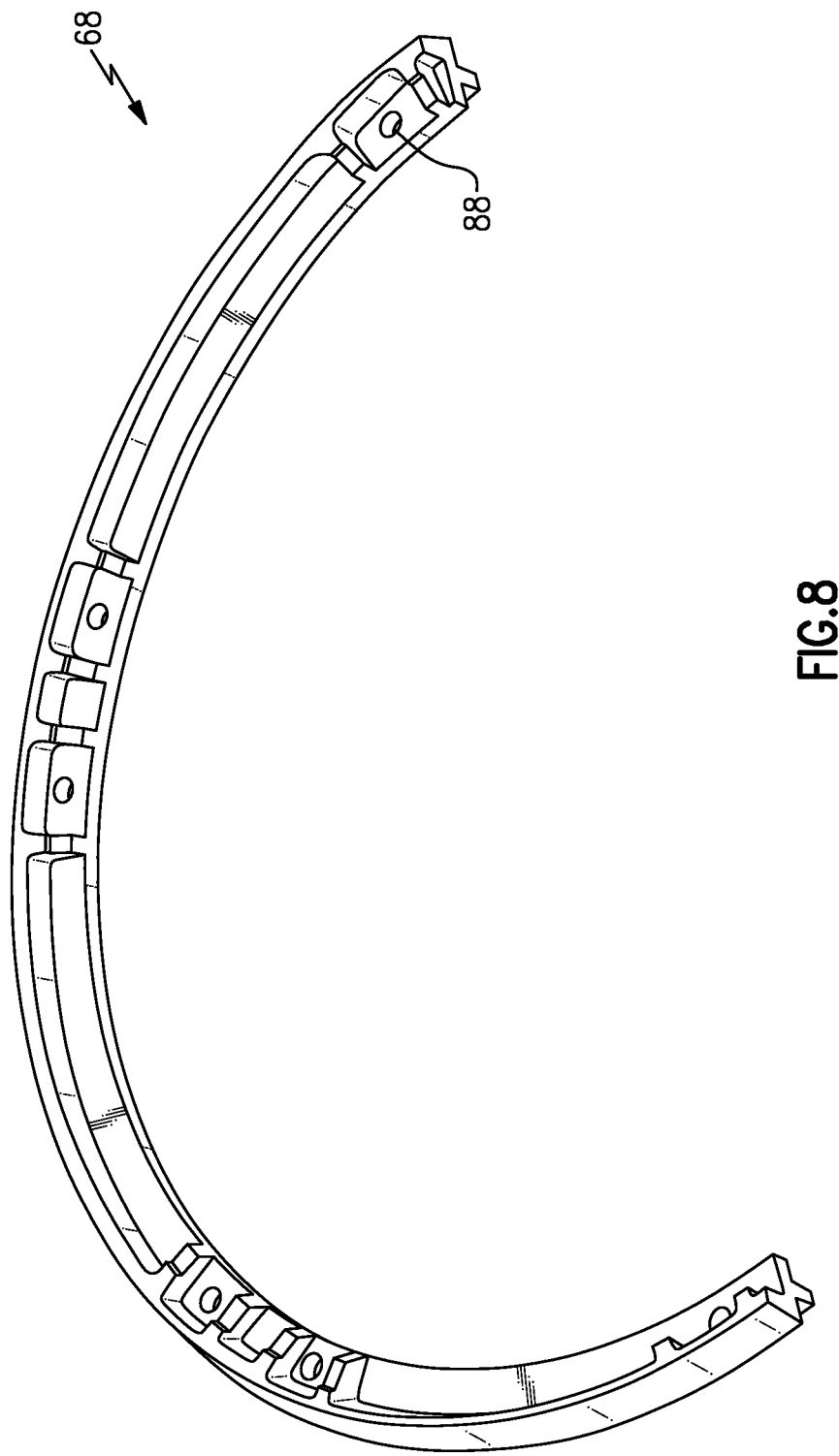
FIG. 8 is a perspective view of a shroud backing plate segment.

Each of the multiple of shroud backing plate segments 68 in the disclosed, non-limiting embodiment are manufactured of a metallic material such as aluminum and define an arcuate segment of approximately one hundred and eighty degrees. (also illustrated in FIG. 8) Each of the multiple of shroud backing plate segments 68 supports the forward core segments 64 and the aft core segments 66 and include apertures 88 which align with apertures 84.

Figure 9:
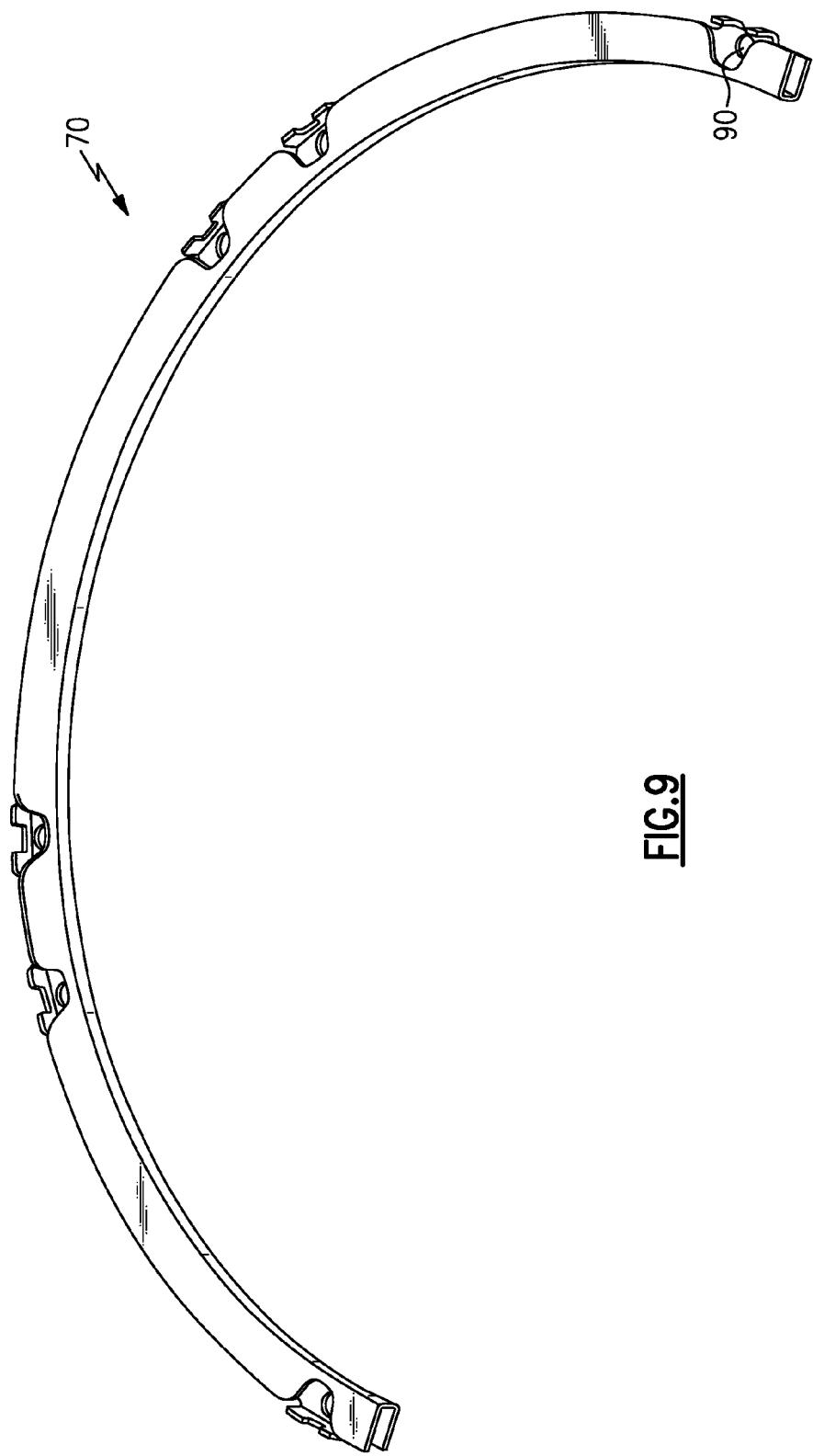
FIG. 9 is a perspective view of a fastener retainer segment.

Each of the multiple of fastener retainers 70 in the disclosed, non-limiting embodiment are manufactured of a metallic material such as Inconel 625 or nickel alloy and define an arcuate segment of approximately one hundred and eighty degrees for receipt into the shroud backing plate segments 68 (also illustrated in FIG. 9). Each of the multiple of fastener retainers 70 are keyed to the adjacent shroud backing plate segments and include apertures 90 which align with apertures 88 and 84 (FIGS. 6 and 7). The multiple of fastener retainers 70 prevent gas impingement onto the heads of the fasteners 72 to provide protection therefrom. The multiple of fastener retainers 70 also lock the fasteners 72 to prevent rotation thereof and thereby provide tertiary retention, fastener abrasion protection and galvanic protection.

Figure 10:
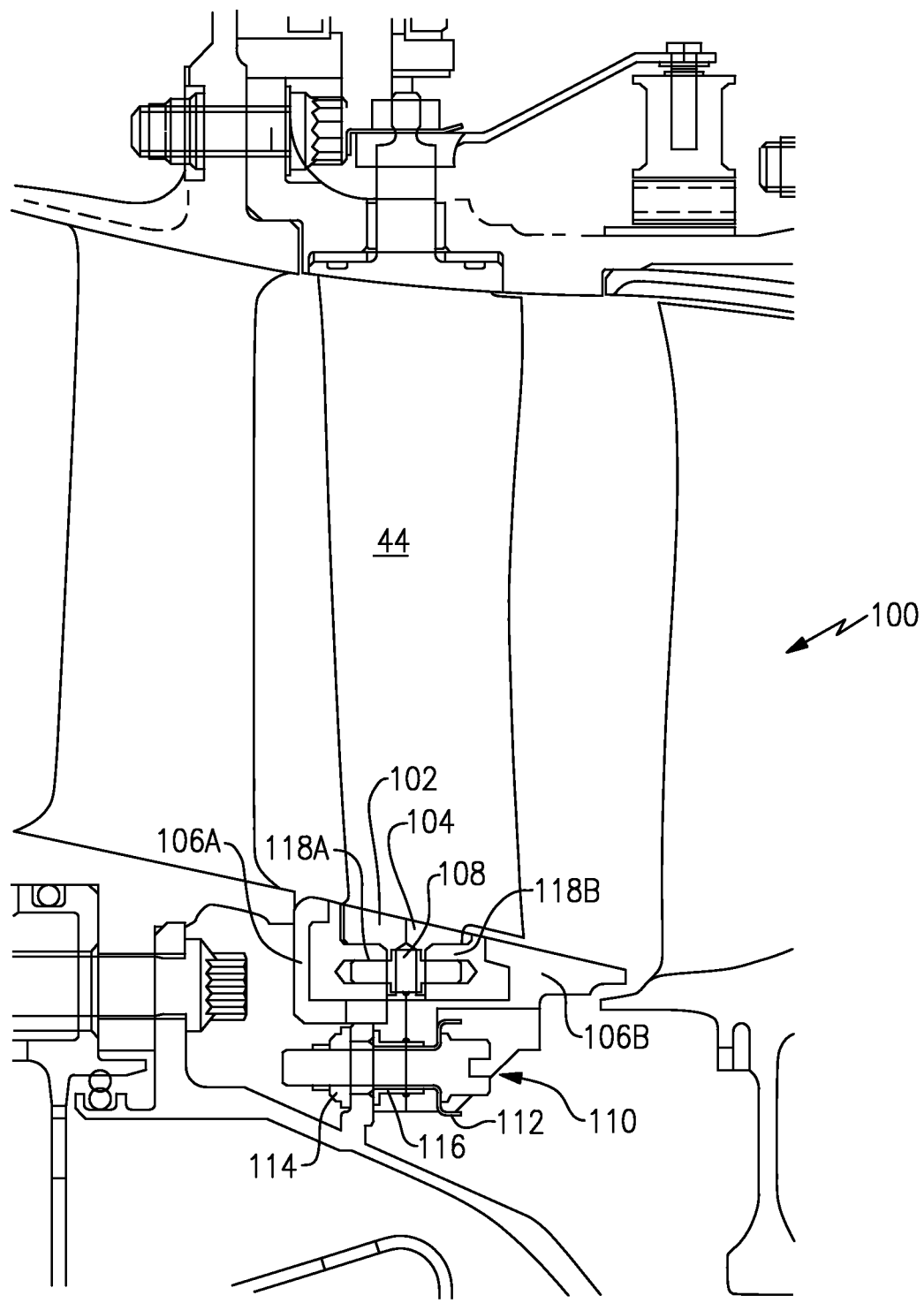
FIG. 10 is an expanded sectional view of the inner shroud assembly of FIG. 10.

Referring to FIG. 10, another non-limiting embodiment of an inner shroud assembly 100 generally includes a multiple of forward core segments 102, a multiple of aft core segments 104, a multiple of shroud backing plate segments 106A, 106B, a multiple of alignment members 108, a multiple of fasteners 110 a multiple of fastener retainers 112, a multiple of fastener receivers 114, and a multiple of fastener receipt members 116.

The forward core segments 102 and the aft core segments 104 in the disclosed, non-limiting embodiment are manufactured of a composite material and define an arcuate segment of approximately sixty degrees generally as described above.

Figure 11:
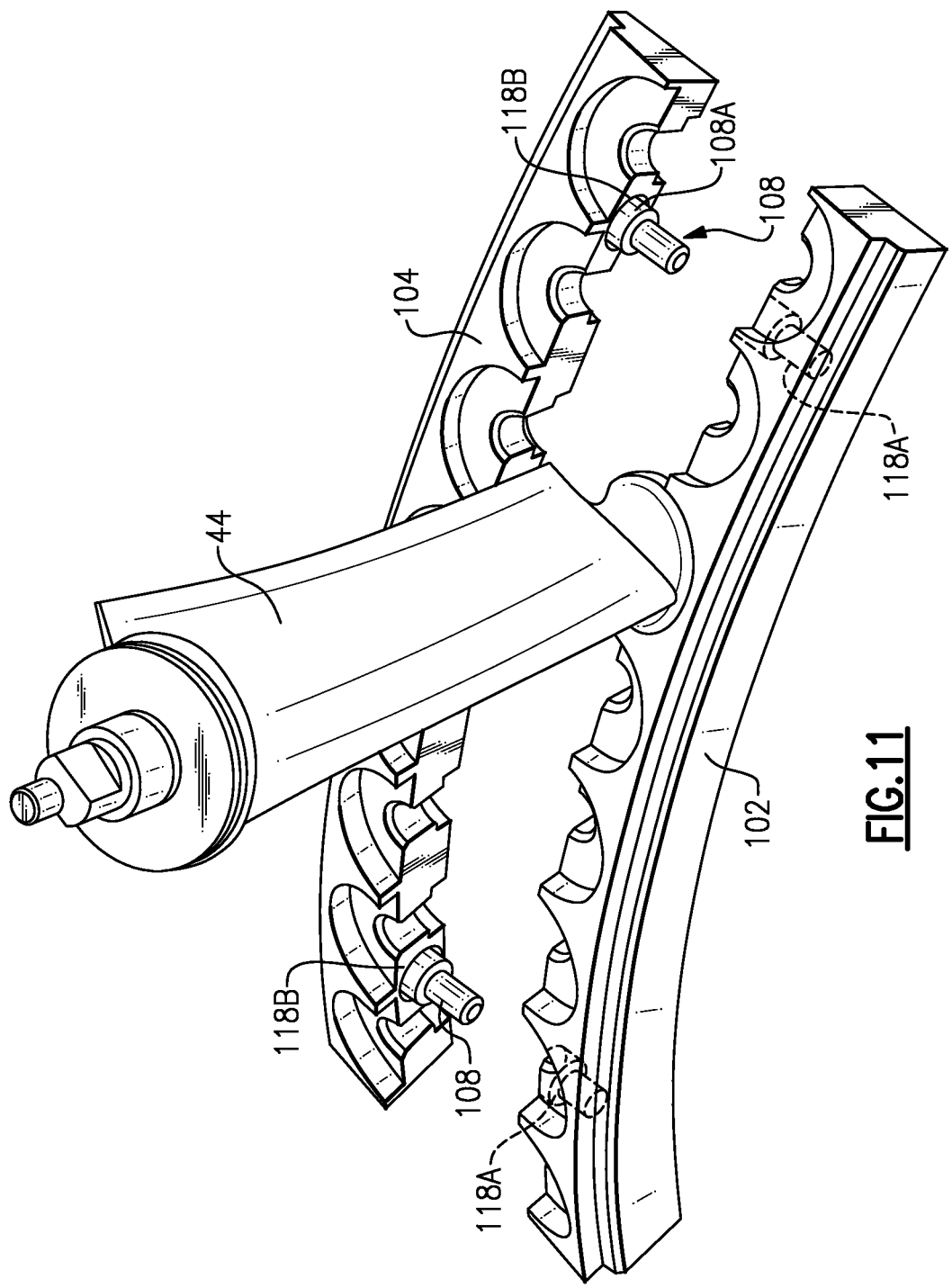
FIG. 11 is an exploded view of the inner shroud assembly of FIG. 10 viewed from an outer perspective thereof.

The forward core segments 102 and the aft core segments 104 define alignment apertures 118A, 118B which receive the alignment members 108 therein (FIG. 11). The alignment members 108 include a central increased diameter section 108A controlling the depth to which the pin is installed and circumferentially aligns 76A and 76B of leading and trailing composite segments 102 and 104 respectively. Alignment member 108 provides structural circumferential and radial alignment of core segments 102 and 104 and additionally enhances production assembly. In this non-limiting embodiment, the multiple of fasteners 110 are separate from the multiple of alignment members 108.

Figure 12:
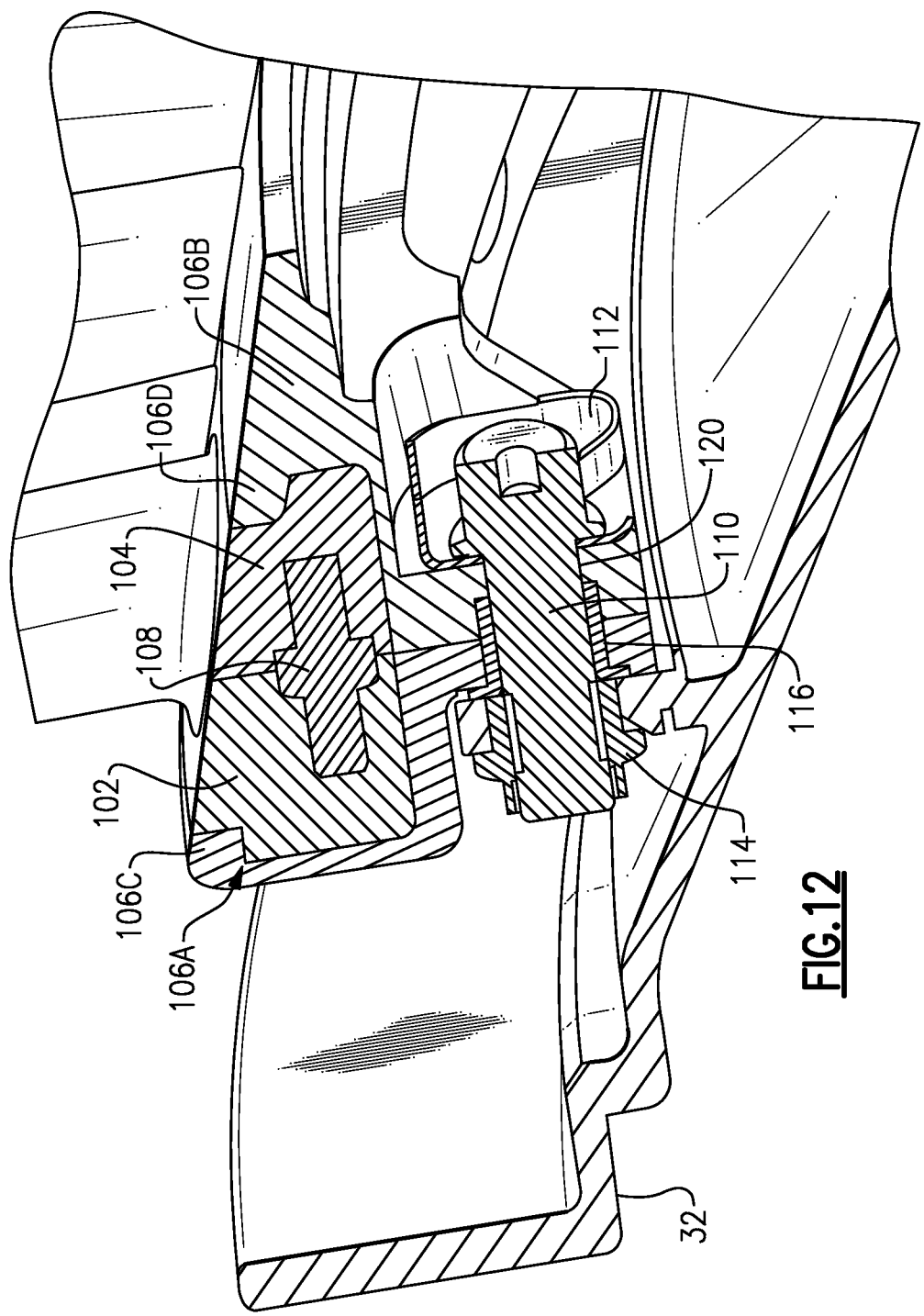
FIG. 12 is a sectional view of the inner shroud assembly of FIG. 10.

Each of the multiple of shroud backing plate segments 106A, 106B in this non-limiting embodiment are manufactured of a metallic material such as aluminum and define an arcuate segment of approximately one hundred and eighty degrees (also illustrated in FIG. 12). Each of the multiple of shroud backing plate segments 106A, 106B supports the respective forward core segments 102 and the aft core segments 104 and includes apertures 120 which receive the fastener receivers 114.

Referring to FIG. 12, the shroud backing plate segments 106A abut the front center body 32 to capture and protect the forward core segments 102. The shroud backing plate segments 106B operates to capture and protect the aft core segments 104. The shroud backing plate segments 106A, 106B may include a respective lip 106C, 106D which captures an upper surface of the forward core segments 102 and the aft core segments 104. Additionally, 106C and 106D minimize non-metallic surfaces of composite segments 102 and 104 exposed to the ID flow path 51.

Figure 13:
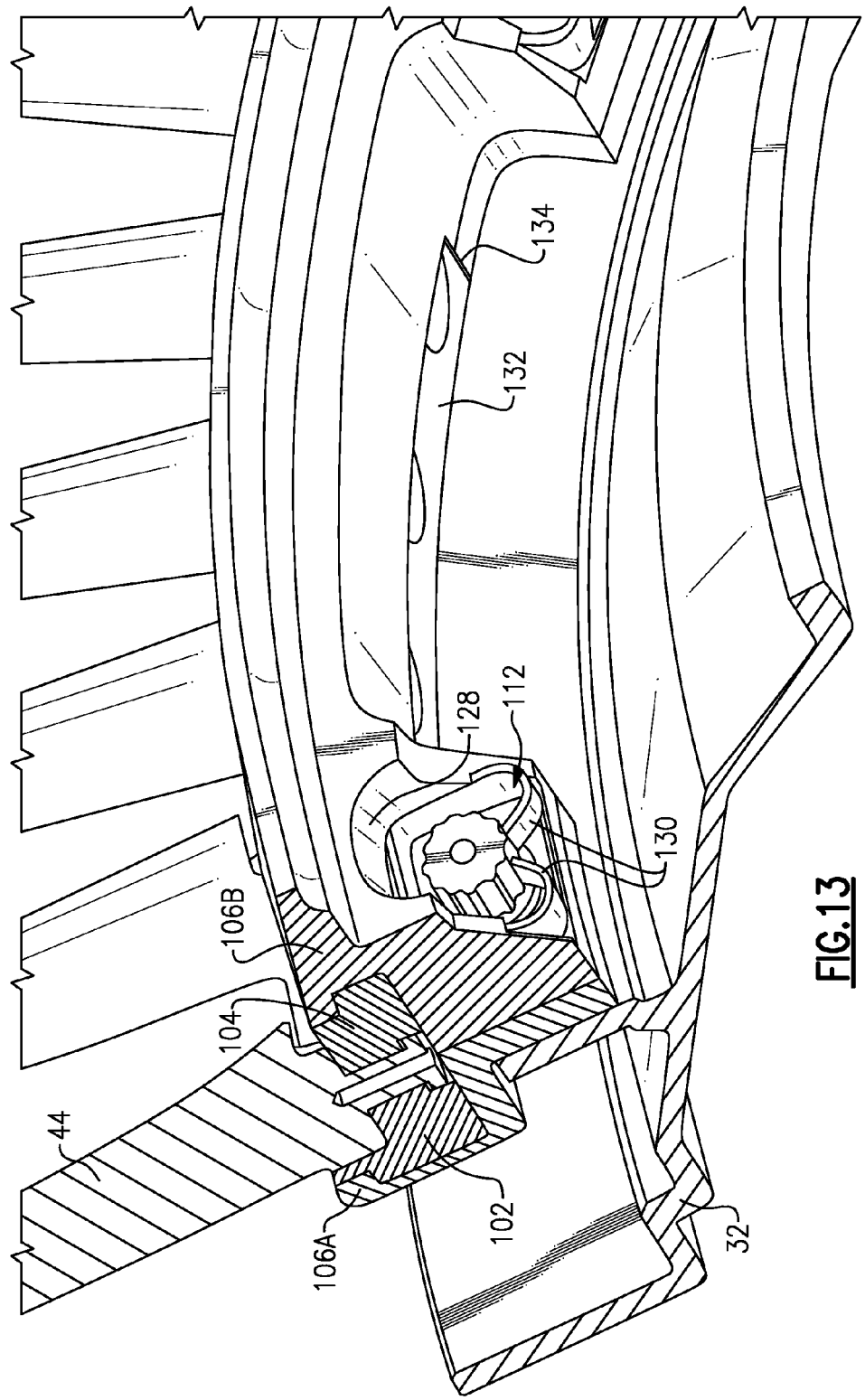
FIG. 13 is a perspective sectional view of the inner shroud assembly of FIG. 10 attached to the Number-2 Bearing Support Housing.
Figure 14:
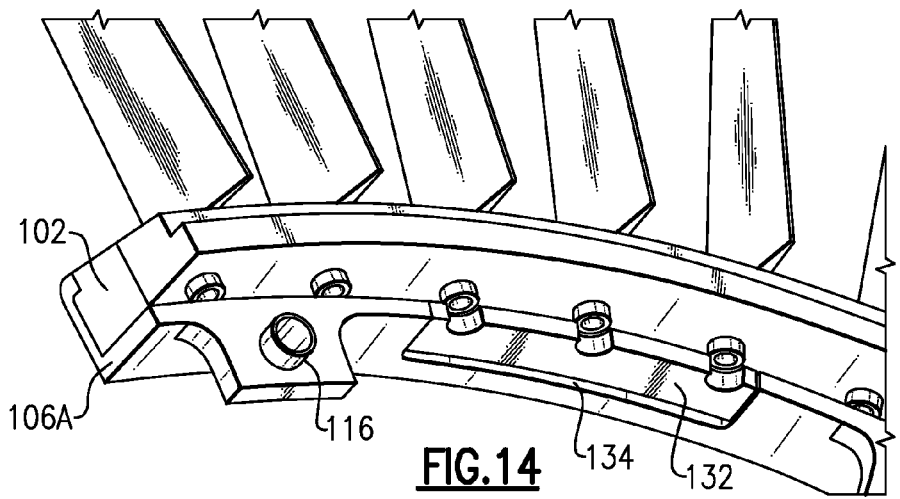
FIG. 14 is a perspective view of the inner shroud assembly of FIG. 10 which illustrates an anti-rotation pad.

Referring to FIG. 13, an anti-rotation pad 132 extends radially inward from the forward core segments 102 to engage with an anti-rotation recessed area 134 within the shroud backing plate segment 106A (also illustrated in FIG. 5). The anti-rotation pad 132 and the anti-rotation recessed area 134 operates as an anti-rotation feature as the fasteners 110 extend through the multiple of fastener receipt members 116 which do not pass through the forward core segments 102 and the aft core segment 104 as in the above discussed non-limiting embodiment (FIG. 14).

The aft shroud backing plate segment 106B includes a recessed area 128 about each aperture 120 to receive the fastener retainer 112 therein. The recessed area 128 essentially follows the outer profile of the fastener retainer 112.

The fastener retainer 112 includes tabs 130 which engage the flange, hex or double hex fastener 110 to prevent rotation thereof and thereby provide a fastener rotation prevention mechanism which uniquely accommodates the flanges of double hex head configured bolt fasteners. A loose fastener 110 will essentially rotate the fastener retainer 112 into the recessed area 128 which operates as a rotation stop to prevent further loosening of the fastener 110.

Figure 15:
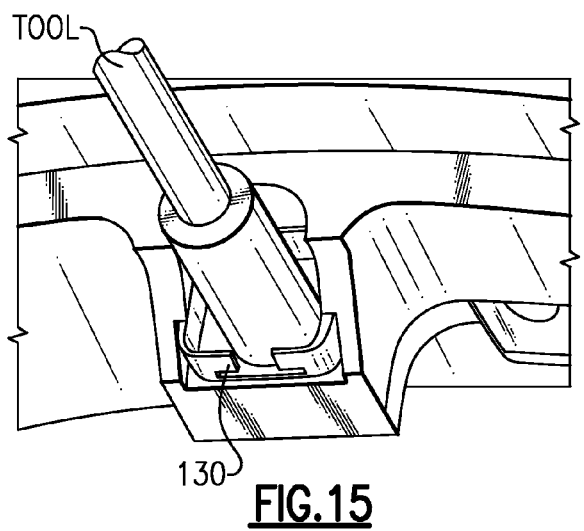
FIG. 15 is a perspective view of a fastener retainer which includes tabs in an unengaged position to receive a tool to tighten/loosen the fastener.
Figure 16:
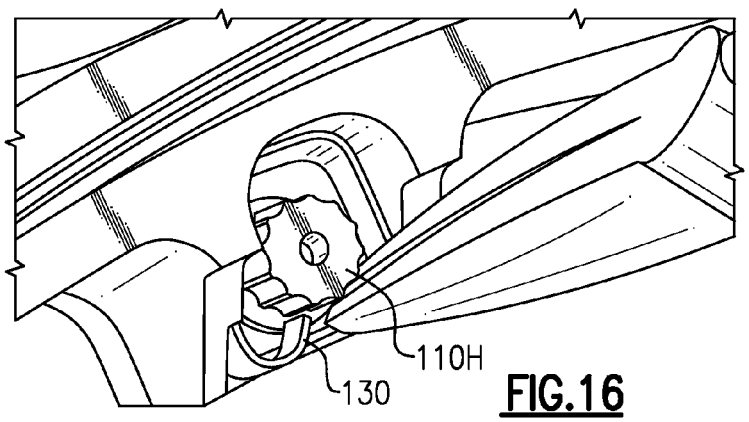
FIG. 16 is a perspective view of a fastener retainer which includes tabs in an engaged position.

The tabs 130 initially provide space to receive a fastener tool which engages the fastener 110 (FIG. 15). Once the fastener 110 is properly tightened, the tabs 30 may be bent into engagement with the fastener head 110H (FIG. 16).

Figure 17:
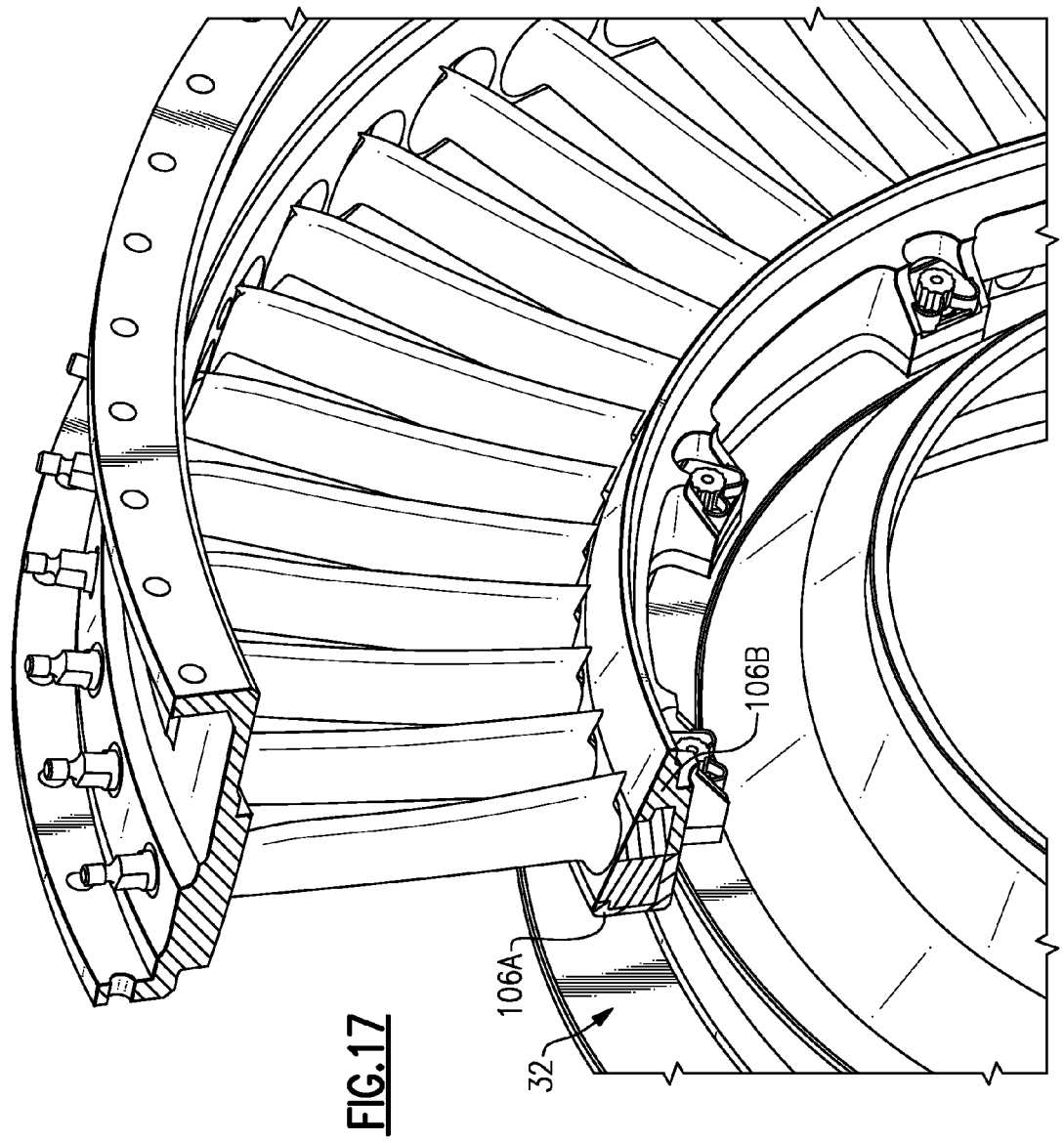
FIG. 17 is a perspective partial sectional view of the inner shroud assembly of FIG. 10.
Figure 18:
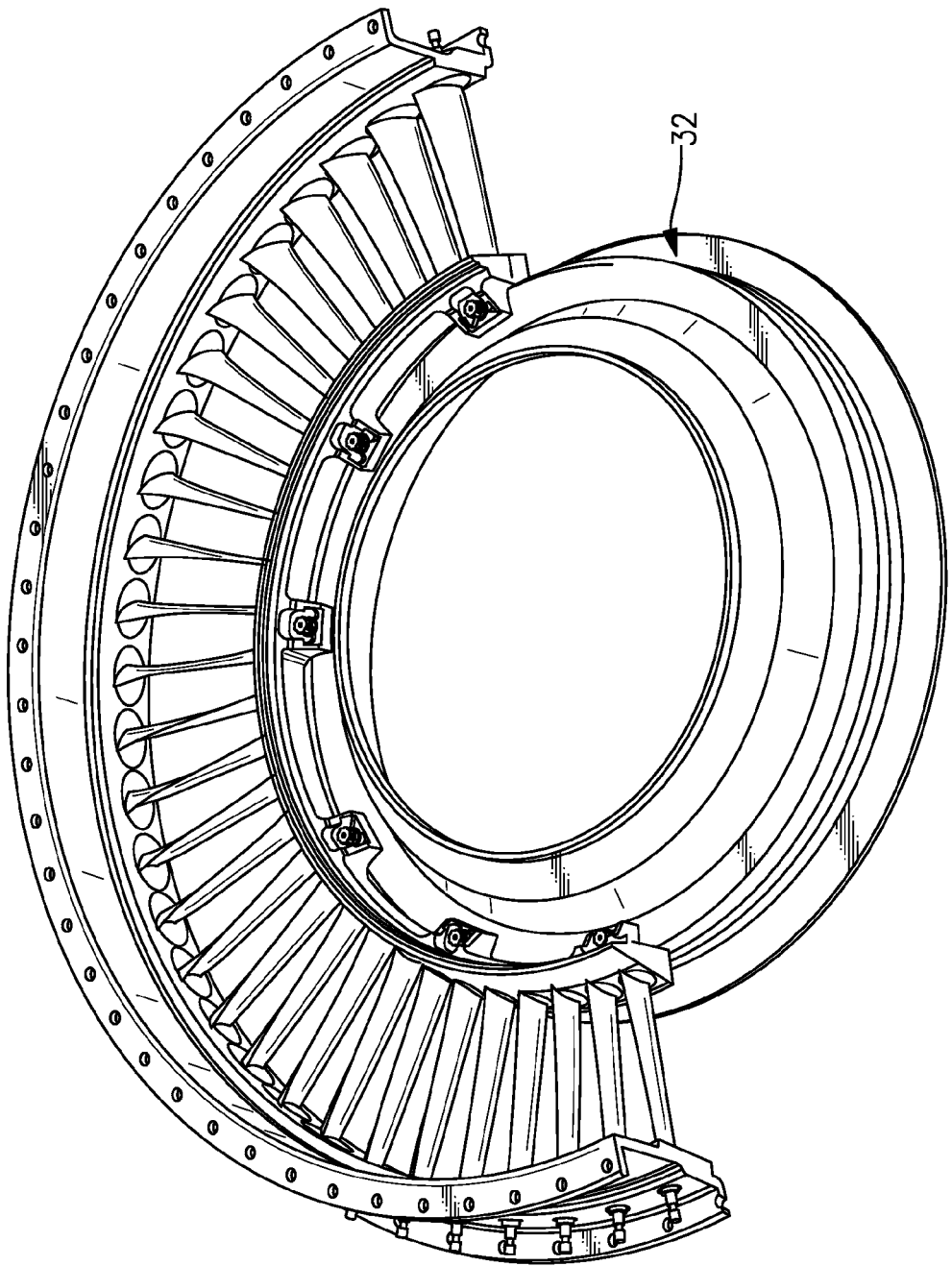
FIG. 18 is a partially assembled view of the inner shroud assembly of FIG. 10 viewed from a rearward perspective thereof.

The tabs 30 also serve to retain the bolt head 110H if unforeseen fractures occur from either fatigue or assembly, achieve tertiary retention. The fastener retainer 112 further provides fastener abrasion protection and galvanic protection (FIGS. 17 and 18).

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An inner shroud assembly comprising:
a forward core segment including an alignment aperture;
an aft core segment mountable to said forward core segment to support a multiple of vanes for rotational movement, said aft core segment including an alignment aperture;
a shroud backing plate segment engageable with said aft core segment;
at least one fastener which passes through said shroud backing plate to retain said aft core segment to said forward core segment;
at least one fastener receipt member mounted within said aft core segment and said forward core segment, wherein said at least one fastener receipt member limits compression upon said forward core segment and said aft core segment if said at least one fastener is tightened, and wherein said at least one fastener receipt member is provided through said alignment apertures of both said forward and aft core segments such that said at least one fastener receipt member spans the entirety of a length of said alignment apertures of both said forward and aft core segments; and
a body, wherein said at least one fastener passes through said at least one fastener receipt member and engages said body when said at least one fastener is tightened.

2. The assembly as recited in claim 1, wherein said aft core segment and said forward core segment are manufactured of a non-metallic material.

3. The assembly as recited in claim 1, wherein each of said at least one fastener passes through said fastener receipt member, said at least one fastener receipt member is a metallic tubular member.

4. The assembly as recited in claim 1, further comprising a fastener retainer mountable to said shroud backing plate segment, said fastener retainer operable to lock said at least one fastener.

5. The assembly as recited in claim 1, further comprising a fastener retainer mountable to said shroud backing plate segment, said fastener retainer includes tabs operable to lock said at least one fastener.

6. The assembly as recited in claim 5, wherein said fastener retainer includes an arcuate surface opposite said tabs.

7. The assembly as recited in claim 6, wherein an outer surface of an aft segment of said shroud backing plate segment defines a recessed area which follows an outer profile of said fastener retainer.

8. The assembly as recited in claim 1, wherein said at least one fastener receipt member abuts a face of said body when said at least one fastener is tightened.

9. The assembly as recited in claim 1, wherein said body is a front center body of a gas turbine engine, said body being a static structure, and wherein an inner shroud assembly is attached to said body.

10. An inner shroud assembly comprising:
a forward core segment;

an aft core segment mountable to said forward core segment to support a multiple of vanes for rotational movement;

a shroud backing plate segment engageable with said aft core segment;

at least one fastener which passes through said shroud backing plate to retain said aft core segment to said forward core segment;

at least one fastener receipt member mounted within said aft core segment and said forward core segment, wherein said fastener receipt member limits compression upon said forward core segment and said aft core segment if said one fastener is tightened; and wherein a fastener retainer defines an arcuate segment of approximately one hundred and eighty degrees.

11. The assembly as recited in claim 10, wherein said fastener retainer is manufactured of a metallic material.

12. An inner shroud assembly comprising:

a forward core segment including an alignment aperture;

an aft core segment mountable to said forward core segment to support a multiple of vanes for rotational movement, said aft core segment including an alignment aperture;

a shroud backing plate segment engageable with said aft core segment;

at least one fastener which passes through said shroud backing plate to retain said aft core segment to said forward core segment;

at least one fastener receipt member mounted within said aft core segment and said forward core segment, wherein said at least one fastener receipt member limits compression upon said forward core segment and said aft core segment if said at least one fastener is tightened, and wherein said at least one fastener receipt member is provided through said alignment apertures of both said forward and aft core segments such that said at least one fastener receipt member spans the entirety of a length of said alignment apertures of both said forward and aft core segments; and at least one annular fastener retainer segment.

13. The assembly as recited in claim 12, wherein said at least one annular fastener retainer segment defines an arcuate segment of approximately one hundred and eighty degrees.

14. The assembly as recited in claim 12, wherein said at least one annular fastener retainer segment is mounted to said shroud backing plate segment.

15. The assembly as recited in claim 12, wherein said at least one annular fastener retainer segment includes tabs to prevent rotation of said at least one fastener.

\* \* \* \* \*